US008296490B2

(12) United States Patent
Li et al.

(10) Patent No.: US 8,296,490 B2
(45) Date of Patent: Oct. 23, 2012

(54) METHOD AND APPARATUS FOR IMPROVING THE EFFICIENCY OF INTERRUPT DELIVERY AT RUNTIME IN A NETWORK SYSTEM

(75) Inventors: Yadong Li, Portland, OR (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 11/771,209

(22) Filed: Jun. 29, 2007

(65) Prior Publication Data

US 2009/0007150 A1  Jan. 1, 2009

(51) Int. Cl.
*G06F 13/24* (2006.01)
*G06F 15/16* (2006.01)
*G06F 3/00* (2006.01)

(52) U.S. Cl. .......................... 710/260; 709/250; 719/321

(58) Field of Classification Search ................... 710/260; 719/321; 709/250
See application file for complete search history.

(56) References Cited

U.S. PATENT DOCUMENTS

| | | | |
|---|---|---|---|
| 4,809,157 A | | 2/1989 | Eilert et al. |
| 5,515,538 A | * | 5/1996 | Kleiman ........................ 710/260 |
| 5,862,366 A | * | 1/1999 | Schmidt et al. ................. 703/21 |
| 6,148,361 A | * | 11/2000 | Carpenter et al. ............ 710/260 |
| 6,269,390 B1 | * | 7/2001 | Boland .......................... 718/100 |
| 6,345,317 B1 | * | 2/2002 | Takeda ............................. 710/2 |
| 6,470,408 B1 | * | 10/2002 | Morrison et al. ............. 710/268 |
| 6,542,942 B1 | * | 4/2003 | Gulati et al. ..................... 710/31 |
| 6,658,448 B1 | * | 12/2003 | Stefaniak et al. ............. 718/104 |
| 6,738,847 B1 | * | 5/2004 | Beale et al. ................... 710/260 |
| 6,742,086 B1 | * | 5/2004 | Cotugno et al. .............. 711/141 |
| 7,117,285 B2 | * | 10/2006 | Ota ............................... 710/265 |
| 7,162,666 B2 | * | 1/2007 | Bono ............................. 714/51 |
| 7,178,145 B2 | * | 2/2007 | Bono ............................ 718/100 |
| 7,249,211 B2 | * | 7/2007 | Wieland et al. ............... 710/269 |
| 7,490,029 B2 | * | 2/2009 | Wasynczuk et al. ............ 703/17 |
| 7,661,107 B1 | * | 2/2010 | Van Dyke et al. ............ 718/104 |
| 7,752,370 B2 | * | 7/2010 | Ma ................................ 710/263 |
| 2004/0054999 A1 | * | 3/2004 | Willen et al. ................. 718/103 |
| 2005/0125582 A1 | * | 6/2005 | Tu et al. ........................ 710/260 |
| 2006/0251109 A1 | | 11/2006 | Muller et al. |
| 2007/0088890 A1 | * | 4/2007 | Wieland et al. ............... 710/269 |
| 2007/0230489 A1 | | 10/2007 | Cornett et al. |
| 2008/0086575 A1 | * | 4/2008 | Foong et al. .................. 709/250 |

OTHER PUBLICATIONS

Annie Foong et al, Architectural Characterization of Processoe Affinity in Network Processing, 2005, IEEE Xplore.*
Sivakumar Radhakrishnan, The Blackford Northbridge Chipset for the Intel 5000, 2007, IEEE Computer Society.*
TMurgent Technologies, White Paper Processor Affinity, Nov. 3, 2003.* Windows Hardware and Drive Central, "Scalable Networking: Eliminating the Receive Processing Bottleneck—Introducing RSS", WinHEC 2004 Version, Apr. 14, 2004, 17 pages.
Salehi et al., "The Effectiveness of Affinity-Based Scheduling in Multiprocessor Network Protocol Processing (Extended Version)", IEEE/ACM Transactions on Networking, vol. 4, No. 4, Aug. 1996.
Office Action dated Nov. 30, 2011 issued in related German Patent Application No. 102008030587.1.

* cited by examiner

*Primary Examiner* — Paul R Myers
*Assistant Examiner* — Christopher A Daley
(74) *Attorney, Agent, or Firm* — Grossman, Tucker, Perreault & Pfleger, PLLC

(57) ABSTRACT

Processor affinity of an application/thread may be used to deliver an interrupt caused by the application/thread to a best processor at runtime. The processor to which the interrupt is delivered may either run the target application/thread or be located in the same socket as the processor that runs the target application/thread. The processor affinity of the application/thread may be pushed down at runtime to a network device, a chipset, a memory control hub ("MCH"), or an input/output hub ("IOH"), which will facilitate delivery of the interrupt using that affinity information.

25 Claims, 8 Drawing Sheets

| | CPU TO WHICH INTERRUPT IS DELIVERED ~810 | CPU THAT RUNS APPLICATION/ THREAD ~820 | CPU UTILIZATION ~830 |
|---|---|---|---|
| 850 | CPU 0 (SOCKET 0) | CPU 0 (SOCKET 0) | CPU 0: 85%; others: idle |
| 855 | CPU 1 (SOCKET 1) | CPU 0 (SOCKET 0) | CPU 0: 85%; CPU 1: 5%; others: idle |
| 860 | CPU 1 (SOCKET 1) | No affinity | Two CPUs: 85% or higher |
| 865 | CPU 2 (SOCKET 0) | CPU 0 (SOCKET 0) | CPU 0: 85%; CPU 2: 5%; others: idle |
| 870 | CPU 3 (SOCKET 1) | CPU 0 (SOCKET 0) | CPU 0: 85%; CPU 3: 5%; others: idle |
| 875 | No affinity (round robin) | No affinity | Two CPUs: 85% or higher |

METHOD AND APPARATUS FOR IMPROVING THE EFFICIENCY OF INTERRUPT DELIVERY AT RUNTIME IN A NETWORK SYSTEM

BACKGROUND

1. Field

This disclosure relates generally to computer network systems, and more specifically but not exclusively, to technologies for improving the efficiency of interrupt delivery at runtime in a network system.

2. Description

In a computer network system, an application or a thread of the application may be scheduled by the Operating System ("OS") at runtime onto any processor or processing core (hereinafter the term "processor" will be used to refer to a processor or a processing core) depending on the utilization of different processors in the system at that moment and on the OS scheduling policy. Typically the OS runtime thread scheduling policy prefers a processor from a socket which has more than one processor available for thread rescheduling. However, a device interrupt is typically delivered to a processor which is pinned down by a static configuration or to all the processors in the system using a round robin scheme. That is, a device interrupt might not be delivered to a processor where the application/thread that the interrupt is targeted for ("target application/thread") runs, or to a socket where the processor is located. When this occurs, there is mismatch between an interrupt and a processor that the interrupt is delivered to. Such mismatches, when occur frequently enough, degrade the system performance greatly because of cache thrashing between interrupt processing and the target application/thread, cost of inter-processor locking, inter-processor interrupts, other system software overheads, and etc. For some applications (e.g., UDP (User Datagram Protocol) applications) where the interrupt rate is high, the rate of such mismatch is also high which result in more performance degradation. Therefore, it is desirable to improve the efficiency of interrupt delivery at runtime in a network system.

BRIEF DESCRIPTION OF THE DRAWINGS

The features and advantages of the disclosed subject matter will become apparent from the following detailed description of the subject matter in which:

FIG. 8 shows a table illustrating an experimental performance improvement of a network system achieved by directing an interrupt directly to the target processor or a peer processor in the same socket as the target processor, according to an embodiment of the subject matter disclosed in the present application.

DETAILED DESCRIPTION

According to embodiments of the subject matter disclosed in this application, processor affinity of an application/thread may be used to deliver an interrupt to a best processor at runtime. The processor to which the interrupt is delivered may either run the target application/thread or be located in the same socket as the processor that runs the target application/thread. In one embodiment, the processor affinity of the application/thread may be pushed down to a network device at runtime and the network device will deliver an interrupt using that affinity information. In another embodiment, the processor affinity of the application/thread may be pushed down to a chipset, a memory control hub ("MCH"), or an input/output hub ("IOH") which will use the affinity information to deliver an interrupt to a best processor. There may be other embodiments according to the spirit of the subject matter disclosed in this application.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
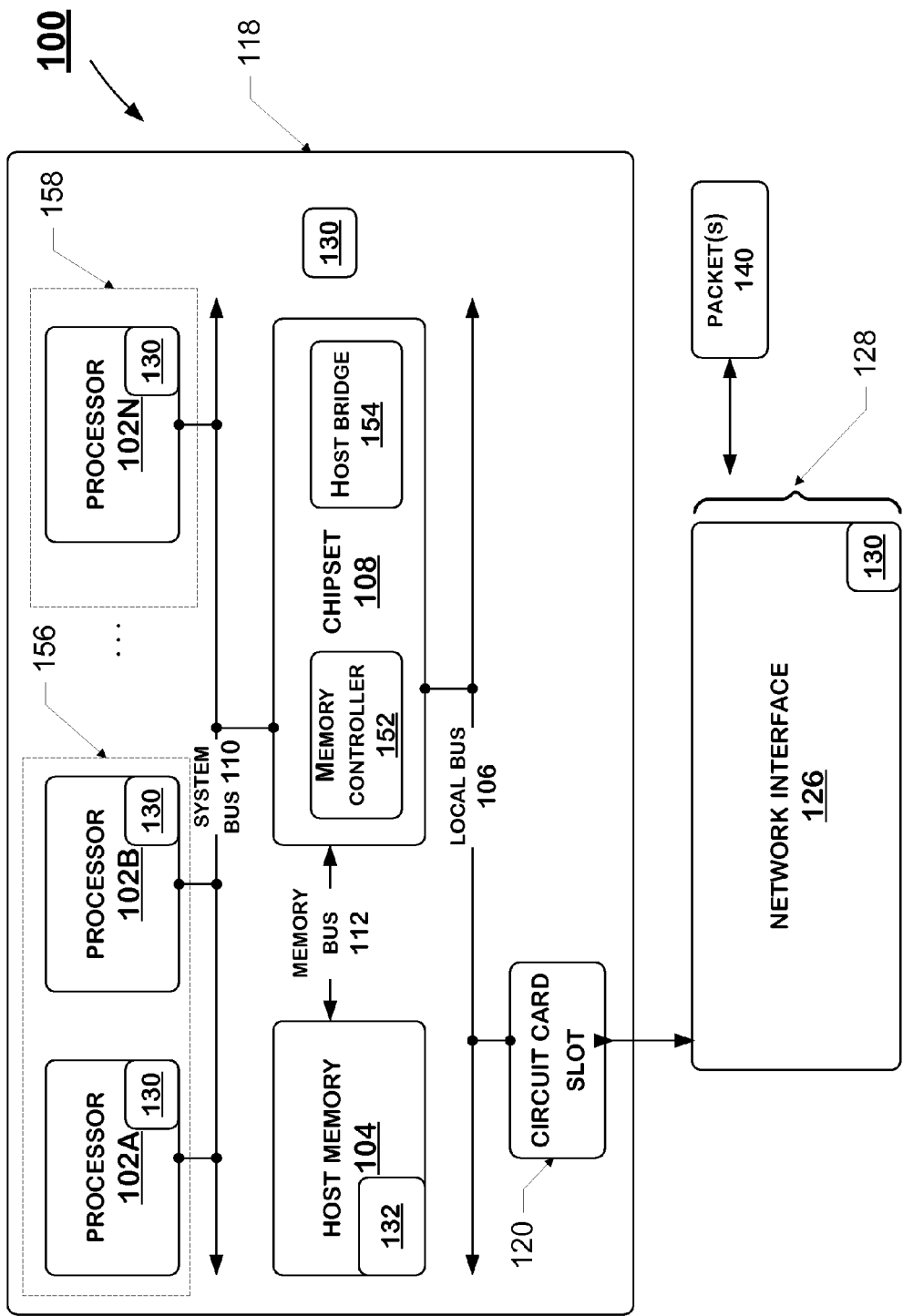
FIG. 1 illustrates a computer system where an embodiment of the subject matter disclosed in the present application may be implemented.

FIG. 1 illustrates a computer system 100 where an embodiment of the subject matter disclosed in the present application may be implemented. System 100 may comprise one or more processors 102A, 102B, . . . , 102N. A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). Another example of a processor is a computational engine that may be comprised in a multi-core processor, for example, where the operating system may perceive the computational engine as a discrete processor with a full set of execution resources. However, these are merely examples of processor and embodiments of the present invention are not limited in this respect.

Each processor 102A, 102B, . . . , 102N may be a coprocessor. In an embodiment, one or more processors 102A, 102B, . . . , 102N may perform substantially the same functions. Each processor may be electronically coupled to a system motherboard 118 through a socket. Two or more processors may share a socket. For example, processor 102A and 102B may share a socket 156; while processor 102N may has its own socket 158. When two or more processors share a socket, they may also share a common cache.

System 100 may additionally comprise memory 104. Memory 104 may store machine-executable instructions 132 that are capable of being executed, and/or data capable of being accessed, operated upon, and/or manipulated. "Machine-executable" instructions as referred to herein relate to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 104 may, for example, comprise read only, mass storage, random access computer-accessible memory, and/or one or more other types of machine-accessible memories.

Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and a memory control hub (MCH), although embodiments of the invention are not limited by this. Chipset 108 may comprise a host bridge/hub 154 that may couple processor 102A, 102B, . . . , 102N, and host memory 104 to each other and to local bus 106. Chipset 108 may communicate with memory 104 via memory bus 112 and with host processor 102 via system bus 110. In alternative embodiments, host processor 102 and host memory 104 may be coupled directly to bus 106, rather than via chipset 108.

Local bus 106 may be coupled to a circuit card slot 120 having a bus connector (not shown). Local bus 106 may comprise a bus that complies with the Peripheral Component Interconnect (PCI) Local Bus Specification, Revision 3.0, Feb. 3, 2004 available from the PCI Special Interest Group, Portland, Oreg., U.S.A. (hereinafter referred to as a "PCI bus"). Alternatively, for example, bus 106 may comprise a bus that complies with the PCI Express™ Base Specification, Revision 1.1, Mar. 28, 2005 also available from the PCI Special Interest Group (hereinafter referred to as a "PCI Express bus"). Bus 106 may comprise other types and configurations of bus systems. System bus 110 may comprise a frond side bus ("FSB"), a links-based point-to-point connection system, or other types of interconnection systems.

System 100 may additionally comprise one or more network interfaces 126 (only one shown). A "network interface" as referred to herein relates to a device which may be coupled to a communication medium to transmit data to and/or receive data from other devices coupled to the communication medium, i.e., to send and receive network traffic. For example, a network interface may transmit packets 140 to and/or receive packets 140 from devices coupled to a network such as a local area network. As used herein, a "packet" means a sequence of one or more symbols and/or values that may be encoded by one or more signals transmitted from at least one sender to at least one receiver. Such a network interface 126 may communicate with other devices according to any one of several data communication formats such as, for example, communication formats according to versions of IEEE (Institute of Electrical and Electronics Engineers) Std. 802.3 (CSMA/CD Access Method, 2002 Edition); IEEE Std. 802.11 (LAN/MAN Wireless LANS, 1999 Edition), IEEE Std. 802.16 (2003 and 2004 Editions, LAN/MAN Broadband Wireless LANS), Universal Serial Bus, Firewire, asynchronous transfer mode (ATM), synchronous optical network (SONET) or synchronous digital hierarchy (SDH) standards.

In an embodiment, network interface 126 may reside on system motherboard 118. In another embodiment, network interface 126 may be integrated onto chipset 108. Yet in another embodiment, network interface 126 may instead be comprised in a circuit card 128 (e.g., NIC or network interface card) that may be inserted into circuit card slot 120. Circuit card slot 120 may comprise, for example, a PCI expansion slot that comprises a PCI bus connector (not shown). PCI bus connector (not shown) may be electrically and mechanically mated with a PCI bus connector (not shown) that is comprised in circuit card 128. Circuit card slot 120 and circuit card 128 may be constructed to permit circuit card 128 to be inserted into circuit card slot 120. When circuit card 128 is inserted into circuit card slot 120, PCI bus connectors (not shown) may become electrically and mechanically coupled to each other. When PCI bus connectors (not shown) are so coupled to each other, logic 130 in circuit card 128 may become electrically coupled to system bus 110.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network interface 126, chipset 108, one or more processors 102A, 102B, . . . , 102N, and/or on motherboard 118. Logic 130 may be used to perform various functions by various components according to embodiments of the subject matter disclosed in the present application.

System 100 may comprise more than one, and other types of memories, buses, processors, and network interfaces. For example, system 100 may comprise a server having multiple processors 102A, 102B, . . . , 102N and multiple network interfaces 126. Processors 102A, 102B, . . . , 102N, memory 104, and busses 106, 110, 112 may be comprised in a single circuit board, such as, for example, a system motherboard 118, but embodiments of the invention are not limited in this respect.

Figure 2:
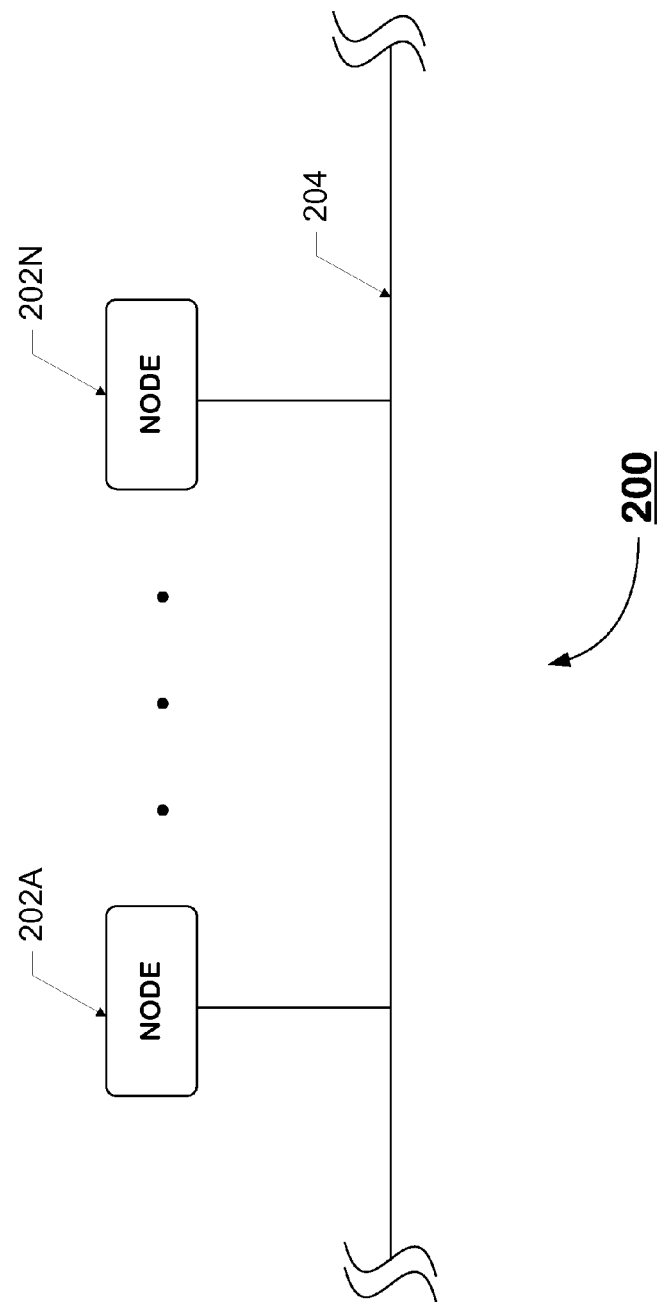
FIG. 2 illustrates a network in which embodiments of the subject matter disclosed in the present application may operate.

FIG. 2 illustrates a network 200 in which embodiments of the subject matter disclosed in the present application may operate. Network 200 may comprise a plurality of nodes 202A, . . . 202N, where each of nodes 202A, . . . , 202N may be communicatively coupled together via a communication medium 204. Nodes 202A . . . 202N may transmit and receive sets of one or more signals via medium 204 that may encode one or more packets. Communication medium 104 may comprise, for example, one or more optical and/or electrical cables, although many alternatives are possible. For example, communication medium 104 may comprise air and/or vacuum, through which nodes 202A . . . 202N may wirelessly transmit and/or receive sets of one or more signals.

In network 200, one or more of the nodes 202A . . . 202N may comprise one or more intermediate stations, such as, for example, one or more hubs, switches, and/or routers; additionally or alternatively, one or more of the nodes 202A . . . 202N may comprise one or more end stations. Also additionally or alternatively, network 200 may comprise one or more not shown intermediate stations, and medium 204 may communicatively couple together at least some of the nodes 202A . . . 202N and one or more of these intermediate stations. Of course, many alternatives are possible.

Figure 3:
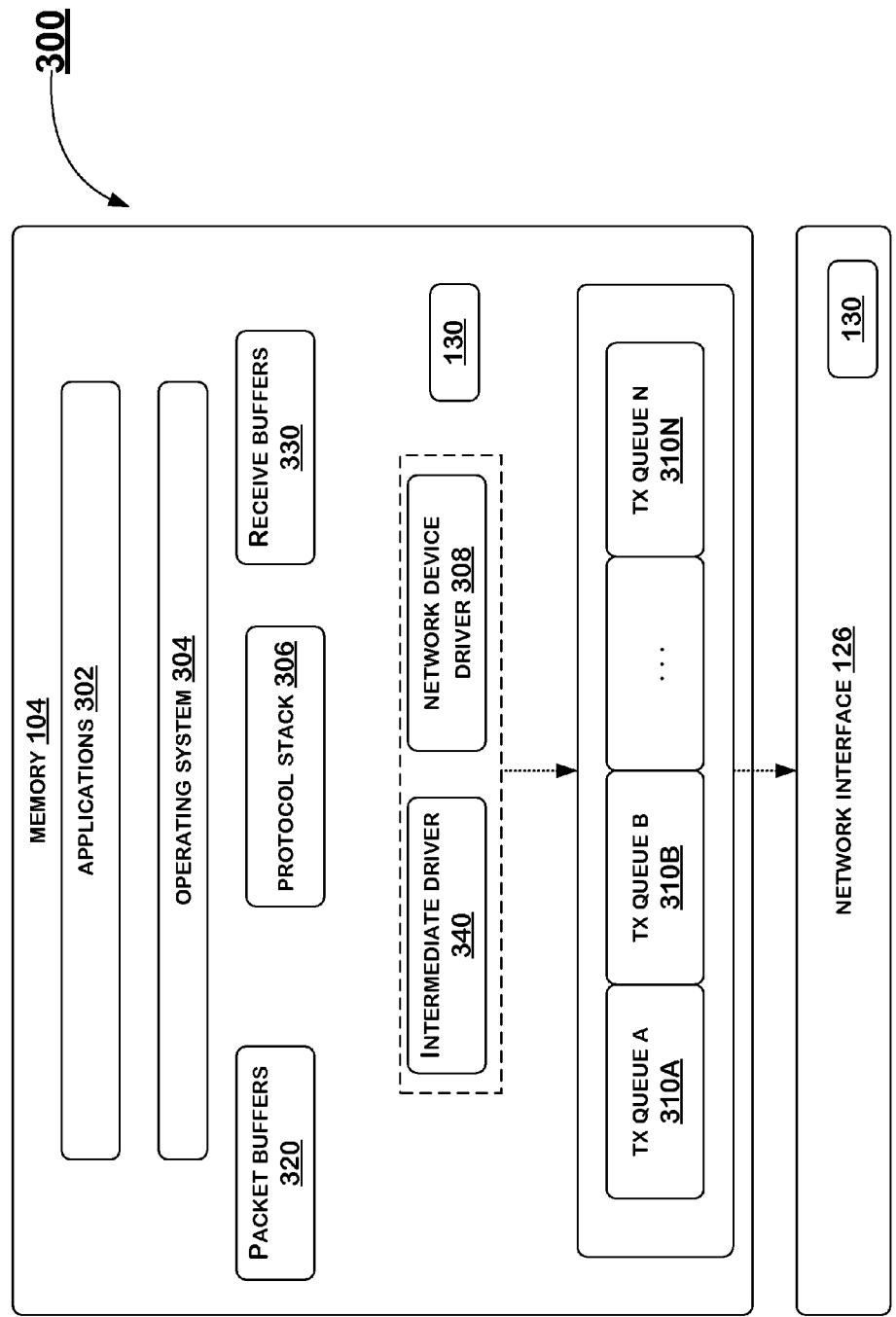
FIG. 3 illustrates a system according to at least one embodiment of the subject matter disclosed in the present application.

FIG. 3 illustrates a system 300 according to at least one embodiment of the invention. As illustrated in FIG. 3, memory 104 may host packet buffers 320, receive queues 330, device driver 308, operating system (OS) 304, intermediate driver 340, transmit queues (Tx queues) 310A-310N, and applications 302.

Packet buffer 320 may include multiple buffers and each buffer may store at least one ingress packet received from a network. Packet buffer 320 may store packets received by network interface 126 that are queued for processing at least by device driver 308, operating system 304, intermediate driver 340, transmit queues (Tx queues) 310A-310N, and/or applications 302.

Receive queues 330 may include input queues and output queues. Input queues may be used to transfer descriptors from a processor (e.g., 102A), a memory (e.g., 104), or other storage coupled to the processor (e.g., a cache of the processor) to one or more network interfaces (e.g., network interface 126). A descriptor may be transferred to a single network interface. A descriptor may describe a location within a buffer and length of the buffer that is available to store an ingress packet. Output queues may be used to transfer return descriptors from any of network interfaces to a processor, a memory, or other storage coupled to the processor. A return descriptor may describe the buffer in which a particular ingress packet is stored within packet buffers 320 and identify features of the packet such as the length of the ingress packet, hash values and packet types, and checksum pass/fail. In one embodiment, receive queues 330 may include multiple input and multiple output queues. In one embodiment, where there are multiple network interfaces, intermediate driver 340 may allocate the receive queues associated with each of network interfaces for use by any of the network interfaces.

Device driver 308 may be device drivers for each of network interfaces (e.g., network interface 126). Although not depicted, in one embodiment, there may be a separate device driver for each of the multiple network interfaces. Device driver 308 may provide an interface between OS 304 and network interfaces (e.g., network interface 126). Device driver 308 may create descriptors and may manage the use and allocation of descriptors in receive queue 330. Device driver 308 may request transfer of descriptors to network interfaces using one or more input queues. Device driver 308 may signal to one of network interfaces that a descriptor is available on an input queue. Device driver 308 may determine the location of the ingress packet in packet buffer 320 based on a return descriptor that describes such ingress packet and device driver 308 may inform operating system 304 (as well as other routines and tasks) of the availability and location of such stored ingress packet.

Operating system 304 may manage system resources and control tasks that are run on system 100. For example, OS 304 may be implemented using Microsoft Windows, HP-UX, Linux, or UNIX, although other operating systems may be used. In one embodiment, OS 304 may be executed by each of the processors 110-0 to 110-N. In one embodiment, when a Microsoft Windows operating system is used, the ndis.sys driver may be utilized at least by device driver 304 and intermediate driver 340. For example, the ndis.sys driver may be utilized to define application programming interfaces (APIs) that can be used for transferring packets between layers. In one embodiment, OS 304 shown in FIG. 3 may be replaced by a virtual machine which may provide a layer of abstraction for underlying hardware to various operating systems running on one or more processors.

Operating system 304 may implement one or more protocol stacks 306 (only one shown). Protocol stack 306 may execute one or more programs to process packets 140. An example of a protocol stack is a TCP/IP (Transport Control Protocol/Internet Protocol) protocol stack comprising one or more programs for handling (e.g., processing or generating) packets 140 to transmit and/or receive over a network. Protocol stack 306 may alternatively be comprised on a dedicated sub-system such as, for example, a TCP offload engine.

In one embodiment, intermediate driver 340 may allocate the receive queues associated with each of network interfaces for use by any of the network interfaces so that network interfaces appear as a single virtual network interface with multiple receive queues to layers above intermediate driver 340 such as but not limited to OS 304. For example, for two network interfaces with two receive queues each, intermediate driver 340 may provide a single virtual network interface with four receive queues (e.g., four input and four output receive queues). Where multiple network interfaces are used, intermediate driver 340 allows taking advantage of features of OS 304 of directing packets for processing by a specific processor even when the device driver for one or any of network interfaces does not support use of multiple receive queues.

In addition to or as an alternative to providing load balancing of packet processing by processors, intermediate driver 340 may provide for load balancing of traffic received from a network via network interfaces. In one embodiment, intermediate driver 340 may provide for load balancing of traffic received from a network among network interfaces. For example, in one embodiment, intermediate driver 340 may include the capability to alter "ARP replies" (described in Ethernet standards) to request that traffic from a source device is thereafter addressed to a particular network interface among network interfaces for load balancing of packets received among network interfaces. Accordingly, packets thereafter may be transmitted from a source node to the selected network interface among network interfaces so that load balancing may take place among network interfaces. For example, intermediate driver 340 may use ARP replies to allocate a first connection for receipt at a first network interface and a second connection for receipt at a second network interface.

Tx queues 310A-310N may buffer data to be transmitted from an output port (for example, an input/output port or outlet) of a node (e.g., node 202A) to another node. If a network device driver only supports one Tx queue, the network device driver may have to acquire a spin lock on the single Tx queue and wait until other processors have released their locks on the Tx queue. The spin lock may result in lock contention which may degrade performance by requiring threads on one processor to "busy wait", and unnecessarily increasing processor utilization, for example. Thus, many modern network device drivers support multiple Tx queues. Distribution of a packet among multiple Tx queues may be based on which processor generates the packet, type, class or quality of service associated with the packet, or data in the packet. Sometimes, even different frames within a packet may be distributed to different Tx queues based on type, class or quality of service associated with frames. In any case, if frames/packets of data are received at a node faster than the frames can be transmitted to another node, the Tx queue or queues begin to fill up with frames. Generally, recently received frames wait in the queue while frames received ahead of them in the queue are first transmitted.

Memory 104 may additionally comprise one or more applications 302 (only one shown). Applications 302 can be one or more machine executable programs that access data from a host system (e.g., 100) or a network. Application 302 may include, for example, a web browser, an email serving application, a file serving application, or a database application.

Memory 104 may further comprise at least some components of logic 130. Some components of logic 130 may be included in network interface 126. The components of logic 130 in memory 104 and network interface 126 together may improve the efficiency of interrupt delivery at runtime in the network system where memory 104 is located. For example, logic 130 may facilitate interrupt from network interface 126 to be delivered to a processor where the target application is running, as illustrated by FIG. 4.

Figure 4:
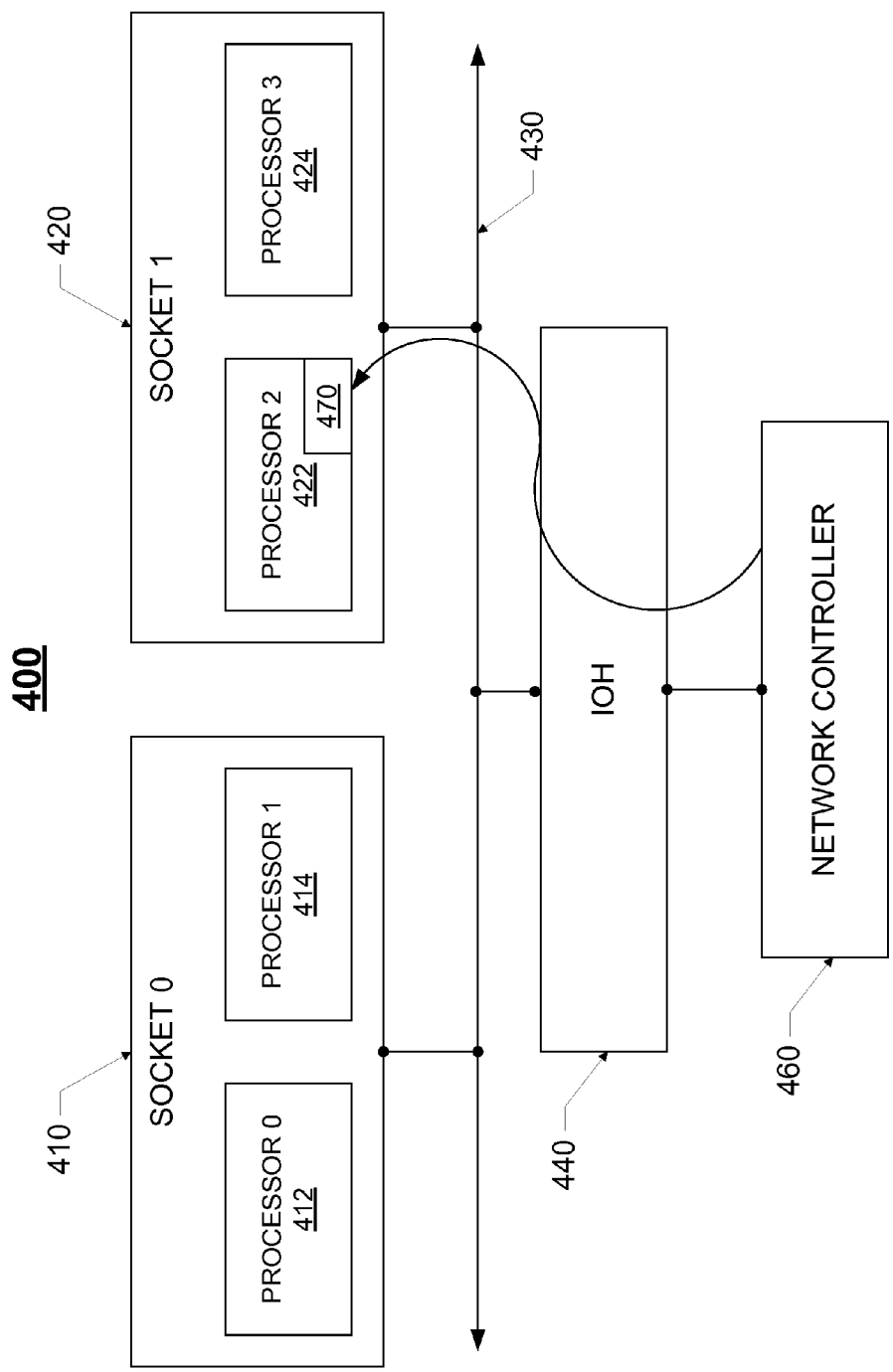
FIG. 4 illustrates an example network system in which interrupts generated by a network interface is directed to a target processor, according to an embodiment of the subject matter disclosed in the present application.

FIG. 4 illustrates an example network system 400 in which interrupts generated by a network interface is directed to a target processor, according to an embodiment of the subject matter disclosed in the present application. Example system 400 comprises two sockets: socket 0 (410) and socket 1 (420). In socket 0 (410), there are two processors: processor 0 (412) and processor 1 (414). In socket 1 (420), there are two processors: processor 2 (422) and processor 3 (424). Although two sockets are shown in the figure and each socket includes two processors, in other embodiments, a network system may comprise one or more than two sockets and an individual socket may include one or more than two processors. Processors in both socket 0 (410) and socket 1 (420) are coupled to an input/output hub ("IOH") 440 through a system bus 430. A network controller/interface 460 is coupled to IOH 440. Any interrupt generated by network controller/interface 460 may be delivered to socket 0 (410) via a static configuration or to a processor based on a round robin scheme.

Example system 400 also includes an application 470 running in the system at time (or time period) X. Based on the utilization of all the processors in the system at time (or time period) X and OS scheduling policy, application 470 is running on processor 2 (422) at time (or time period) X. When network controller/interface 460 generates an interrupt which targets application 470, the interrupt might not be delivered to processor 2 (422) in a conventional network system. For example, the interrupt may be delivered processor 0 (412) in socket 0 (410) via a static configuration; or the interrupt may be delivered randomly to any of the four processors using a round robin scheme. According to an embodiment of the subject matter disclosed in the present application, network controller/interface 460 as well as a device driver in the network system may be so configured that an interrupt that targets an application or a thread of an application will be delivered to the processor where the application/thread is running. In the example shown in FIG. 4, the interrupt that targets application 470 will be delivered to processor 2 (422).

Since the OS may reschedule an application/thread at any time during runtime, the processor affinity of the application/thread (i.e., the identification of a processor where the application/thread runs) may change during runtime. In one embodiment, a network device driver (e.g., 308 or 340 in FIG. 3) may push down the processor affinity of the application/thread to the network device (e.g., network interface 126 in FIG. 3) at runtime. The network device will then generate the interrupt with the same processor affinity.

Figure 5:
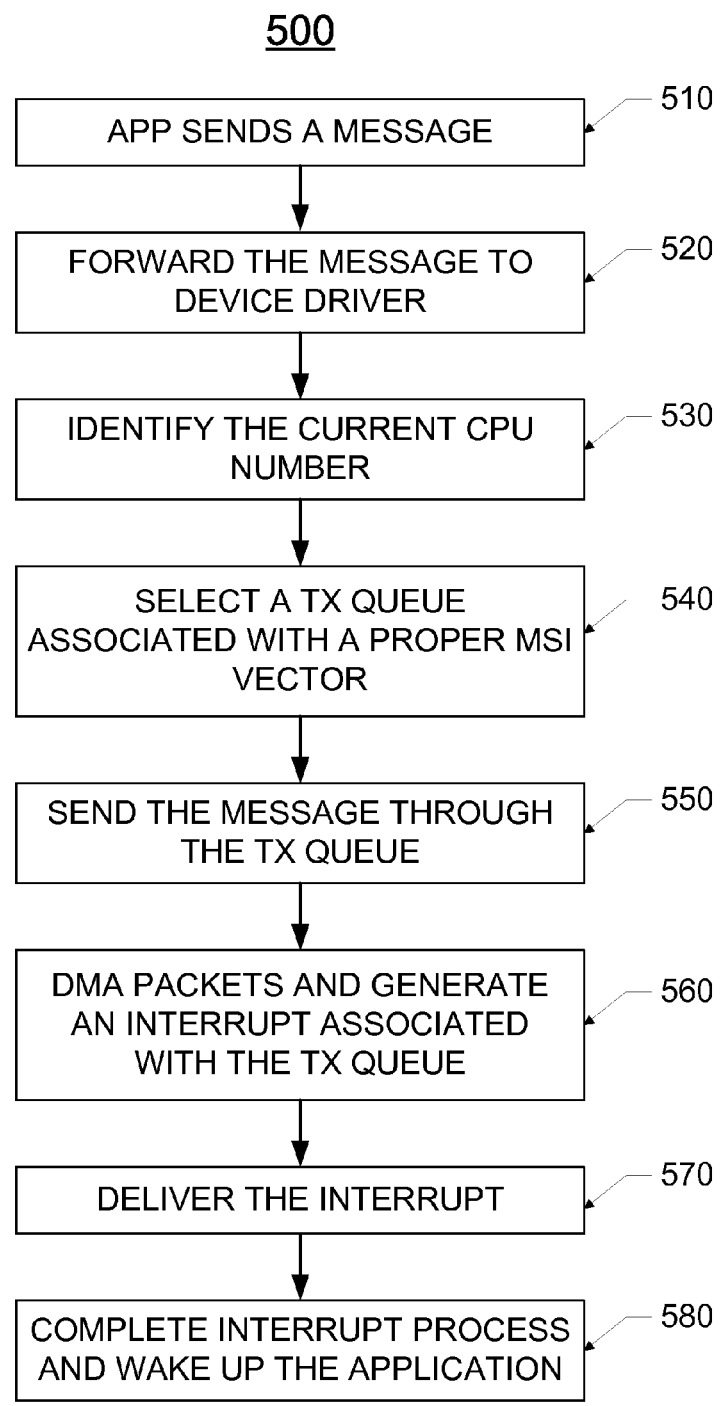
FIG. 5 shows a flowchart of an example process for improving the efficiency of interrupt delivery at runtime in a network system, according to an embodiment of the subject matter disclosed in the present application.

FIG. 5 shows a flowchart of an example process 500 for improving the efficiency of interrupt delivery at runtime in a network system. At block 510, an application/thread may send out a message or other data to other users in the network. At block 520, the OS kernel may forward the message to a device driver (e.g., 308 or 340 in FIG. 3). At block 530, the device driver may identify the number of the current processor on which the application/thread runs, i.e., the device driver finds out the processor affinity of the application/thread. At block 540, the device driver may select a Tx queue which is associated with a proper MSI-X vector. MSI stands for Message Signaled Interrupt, which is a required feature for PCI Express devices. MSI may be considered an advanced interrupt scheme compared to pin-assertion type of interrupt. An MSI capability structure includes a Message Control register, a Message Address register and a Message Data register. These registers provide the bus driver control over MSI. The Message Control register indicates the MSI capability supported by the device. The Message Address register specifies the target address and the Message Data register specifies the characteristics of the message. An MSI capability structure may be considered as an interrupt vector which includes several elements such as target address of a message, characteristics of the message, and etc. MSI-X is an extension to MSI and includes more than one such interrupt vector.

Figure 6:
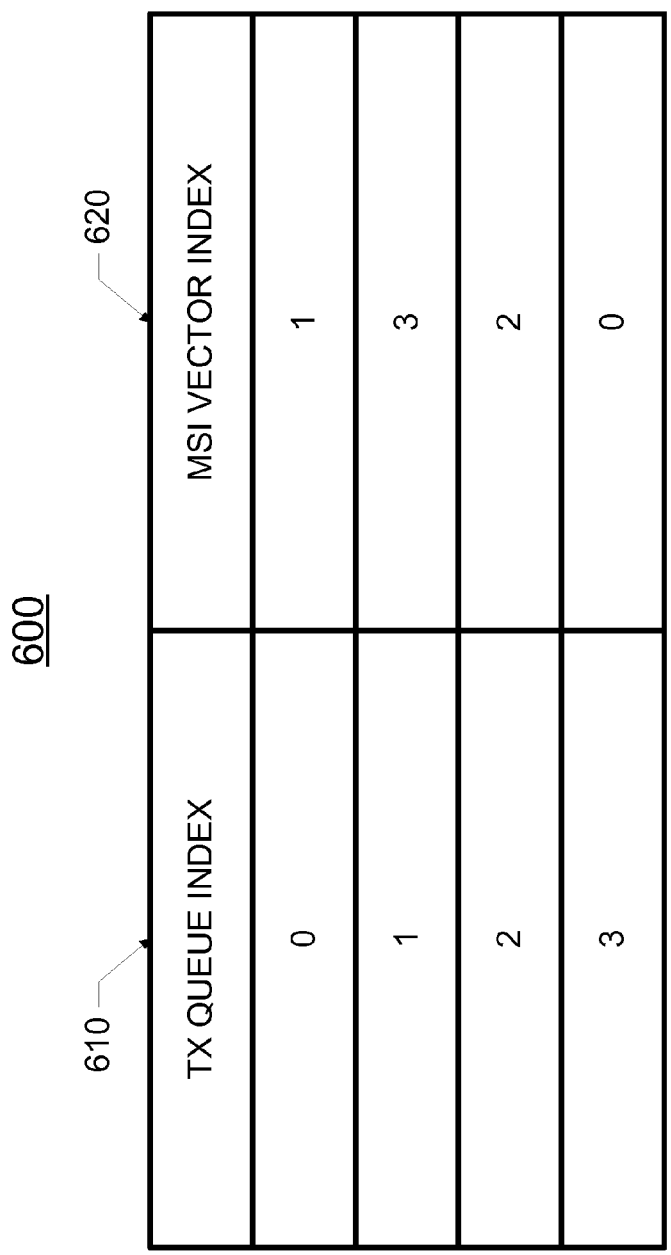
FIG. 6 shows a table illustrating association relationship between the Tx queue index and the MSI vector index.

If the network system supports the MSI-X based interrupt scheme, each interrupt vector of the MSI-X scheme may be associated with a Tx queue number. FIG. 6 shows a table 600 illustrating such association between the Tx queue index and the MSI vector index. Table 600 includes two columns: column 610 (Tx queue index) and column 620 (MSI vector index). For example, Tx queue 0 may be associated with MSI vector 1; Tx queue 1 may be associated with MSI vector 3; Tx queue 2 may be associated with MSI vector 2; etc. Table 600 is used for illustration purpose. In practice, there may more or less than 4 Tx queues or MSI vectors; and the total number of Tx queues does not necessarily equal to the total number of MSI vectors. The association information between the Tx queues and MSI vectors may be stored in a network device such as network interface 126 shown in FIG. 3.

Returning now to FIG. 5, each MSI interrupt vector may include processor identification information of a processor for which the interrupt is targeted. At block 540, a Tx queue associated with an MSI interrupt vector whose processor identification information matches the processor affinity of the application/thread identified at block 530 may be selected. If there is no MSI interrupt vector whose processor identification information matches the identified processor affinity of the application/thread, an alternative MSI interrupt vector whose processor identification information matches any one of processors in the same socket as the identified processor that runs the application/thread may be used. Accordingly, a Tx queue associated with such an alternative MSI interrupt vector may be selected.

At block 550, the message may be sent through the Tx queue selected at block 540. At block 560, the network device may obtain packets in the message through direct memory access (DMA) from the selected Tx queue. Once the message is in the device buffer or is sent out, the network device generates an interrupt using the interrupt vector associated with the Tx queue selected at block 540. At block 570, the interrupt may be delivered to the target processor which matches the processor affinity of the application/thread or a peer processor in the same socket as the processor that runs the application/thread. At block 580, the device driver may process Tx completion and free the packet buffer at the selected Tx queue. The application/thread may then wake up and keep running.

Process 500 shown in FIG. 5 assumes that the network system supports multiple Tx queues and there are multiple interrupt vectors available for use. This assumption is typically true with modern network systems. If the network system supports only one Tx queue but with multiple MSI-X vectors available, the device driver may inform the network device the next interrupt vector to be used the identified processor affinity at runtime so that the device interrupt can be delivered to the target processor directly.

In another embodiment where an intermediate device driver (e.g., 340 in FIG. 3) is used, the subject matter disclosed above may be altered to fit the intermediate device driver. For example, the intermediate device driver may distribute the packet to a miniport instance whose device has an interrupt vector whose processor identification information matches the processor affinity of the current running application/thread.

Yet in another embodiment, the device driver may push down the processor affinity of the application to the chipset such as memory control hub (MCH) or IOH. When the chipset receives the interrupt from the device, it delivers the interrupt to the right CPU. This approach may work well for a device supporting only one interrupt vector such a PCI legacy interrupt or MSI with a single message.

Figure 7:
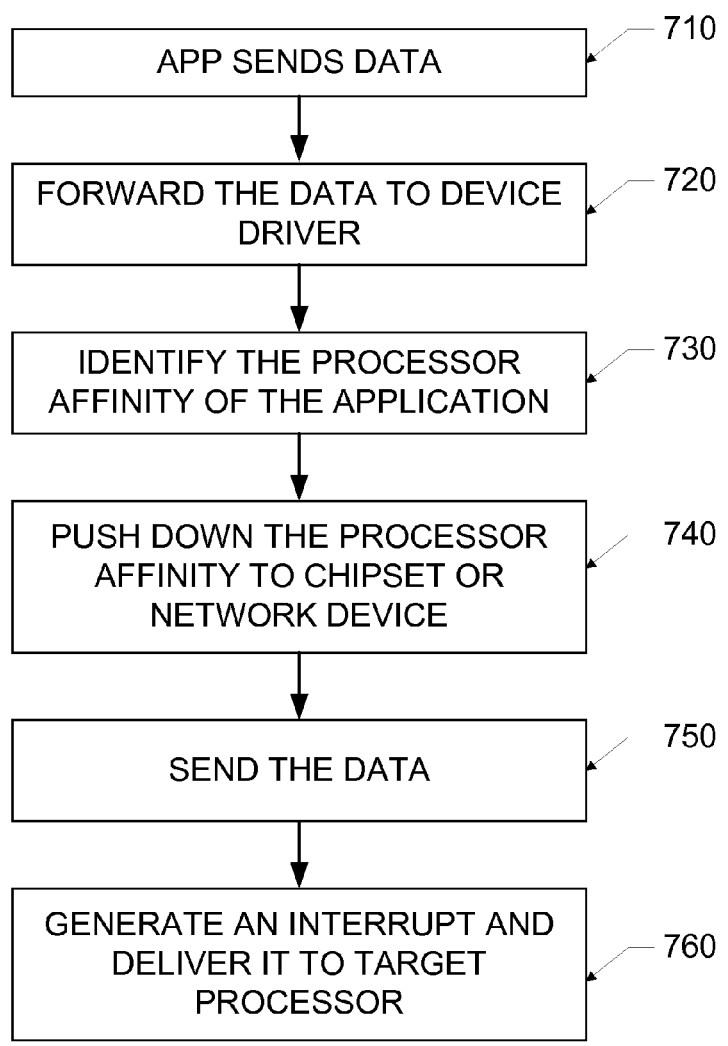
FIG. 7 shows a flowchart of another example process for improving the efficiency of interrupt delivery at runtime in a network system, according to an embodiment of the subject matter disclosed in the present application.

FIG. 7 shows a flowchart of another example process 700 for improving the efficiency of interrupt delivery at runtime in a network system. At block 710, an application/thread may send out data. At block 720, the OS kernel may forward the data to device driver. At block 730, the device driver may identify the processor affinity of the application/thread. At block 740, the device driver may push down the identified processor affinity to the chipset or the network device (e.g., network interface 126 in FIG. 3). At block 750, the data may be sent out (e.g., either be transferred to the network device's buffer or be sent out onto the wire or wirelessly). At block 760, an interrupt may be generated by the device and be delivered directly to the right processor based on the pushed down identified affinity of the application/thread.

FIG. 8 shows a table 800 illustrating an experimental performance improvement of a network system achieved by directing an interrupt directly to the target processor or a peer processor in the same socket as the target processor, according to an embodiment of the subject matter disclosed herein. Table 800 has three columns: column 810 shows processor to which an interrupt is delivered; column 820 shows processor that runs an application/thread which causes the interrupt; and column 830 shows processor utilization; The network system used in the experiment that resulted in data shown in Table 800 is configured to include two sockets: socket 0 and socket 1. Each socket has two processors: socket 0 includes CPU 0 and CPU 2; and socket 1 includes CPU 1 and CPU 3. ESB2 based PRO1000 network adapters which support MSI/MSI-X message based interrupt is used. Windows® Longhorn server is used in the experiment. UDP messages are sent by a CPU running the application/thread.

The experimental performance indicates that when the processor affinity of the interrupt (i.e., the processor to which the interrupt is delivered) and the processor affinity of the application are the same or are in the same socket (see row 850 and row 865 in table 800), the throughput is the highest while the overall CPU utilization is the lowest. In other situations (e.g., rows 855, 860, 870, and 875 shown in table 800) where the processor affinity of interrupt and the processor affinity of application are not the same or in the same socket, the throughput degrades and the overall CPU utilization increases.

Although an example embodiment of the disclosed subject matter is described with reference to drawings in FIGS. 1-8, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for improving the efficiency of interrupt delivery at runtime in a network system, comprising:
    sending data to other users in the network system by an application;
    forwarding the data to a device driver by an operating system;
    identifying a processor affinity of the application at runtime by the device driver, the processor affinity including an identity of a processor that runs the application, wherein the operating system is configured to change the processor affinity of the application during runtime; and
    associating an interrupt with the processor affinity of the application by the device driver at runtime, wherein the interrupt is generated by a network device upon sending out the data, and wherein associating the interrupt is configured to target the interrupt to the identified processor that runs the application or one or more peer processors;
    wherein associating the interrupt with the processor affinity of the application comprises sending the processor affinity of the application to at least one of the network device or a chipset.

2. The method of claim 1, further comprising delivering the interrupt directly to the processor that runs the application based at least in part on the processor affinity of the application.

3. The method of claim 1, wherein associating the interrupt with the processor affinity of the application comprises selecting a transmit queue, the transmit queue associated with a message-based interrupt vector which includes the identity of the processor that runs the application.

4. The method of claim 3, further comprising:
    sending the data through the selected transmit queue; and
    transferring packets of the data from the selected transmit queue to the network device.

5. The method of claim 1, wherein the device driver comprises a driver of the network device, the network device including a network interface card.

6. The method of claim 5, further comprising generating an interrupt when the data is stored into a buffer of the network device or when the data is sent out of the network device.

7. The method of claim 1, wherein the device driver comprises an intermediate driver for a plurality of network devices.

8. An apparatus for improving the efficiency of interrupt delivery at runtime in a network system, comprising:
    logic comprising a device driver, the device driver to
        identify a processor affinity of an application at runtime, the processor affinity including an identity of a processor that runs the application, wherein an operating system is configured to change the processor affinity of the application during runtime;
        associate an interrupt with the processor affinity of the application at runtime, wherein the interrupt is generated by a network device upon sending out data from the application, and wherein associating the interrupt is configured to target the interrupt to the identified processor that runs the application or one or more peer processors; and
        associate the interrupt with the processor affinity of the application via operations including sending the processor affinity of the application to at least one of the network device or a chipset.

9. The apparatus of claim 8, wherein the logic further delivers the interrupt directly to the processor that runs the application based at least in part on the processor affinity of the application.

10. The apparatus of claim 8, wherein the logic associates the interrupt with the processor affinity of the application via operations including selecting a transmit queue, the transmit queue associated with a message-based interrupt vector which includes the identity of the processor that runs the application.

11. The apparatus of claim 10, wherein the logic further sends the data from the application through the selected transmit queue; and transfers packets of the data from the selected transmit queue to the network device.

12. The apparatus of claim 8, wherein the logic comprises at least one of a driver of the network device or an intermediate driver for a plurality of network devices, the network device including a network interface card.

13. A computing system, comprising:
    logic comprising a device driver, the device driver to
        identify a processor affinity of an application at runtime, the processor affinity including an identity of a processor that runs the application, wherein an operating system is configured to change the processor affinity of the application during runtime, and
        associate an interrupt with the processor affinity of the application at runtime, wherein the interrupt is generated by a network device upon sending out data from the application, and wherein associating the interrupt is configured to target the interrupt to the identified processor that runs the application or one or more peer processors;
        associate the interrupt with the processor affinity of the application via operations including sending the processor affinity of the application to at least one of the network device or a chipset; and
    a circuit card coupled to a circuit board to host the network device, the circuit card operable to receive the data from the application and to send the data out to a destination.

14. The computing system of claim 13, wherein the logic further delivers the interrupt directly to the processor that runs the application based at least in part on the processor affinity of the application.

15. The computing system of claim 13, wherein the logic associates the interrupt with the processor affinity of the application via operations including selecting a transmit queue, the transmit queue associated with a message-based interrupt vector which includes the identity of the processor that runs the application.

16. The computing system of claim 15, wherein the logic further sends the data from the application through the selected transmit queue; and transfers packets of the data from the selected transmit queue to the network device.

17. The computing system of claim 15, wherein the circuit card operable to access a plurality of transmit queues including the selected transmit queue, and to transmit one or more packets from the plurality of transmit queues.

18. The computing system of claim 13, wherein the logic comprises at least one of a driver of the network device or an intermediate driver for a plurality of network devices.

19. The computing system of claim 13, wherein the circuit card comprises a network interface card.

20. An article comprising a machine-readable medium that contains instructions, which when executed by a processing platform, cause said processing platform to perform operations including:

sending data to other users in the network system by an application;

forwarding the data to a device driver by an operating system;

identifying a processor affinity of the application at runtime by the device driver, the processor affinity including an identity of a processor that runs the application, wherein the operating system is configured to change the processor affinity of the application during runtime; and associating an interrupt with the processor affinity of the application by the device driver at runtime, wherein:

associating the interrupt with the processor affinity of the application comprises sending the processor affinity of the application to at least one of the network device or a chipset;

the interrupt is generated by a network device upon sending out the data; and associating the interrupt is configured to target the interrupt to the identified processor that runs the application or one or more peer processors.

21. The article of claim 20, wherein the operations further comprise delivering the interrupt directly to the processor that runs the application based at least in part on the processor affinity of the application.

22. The article of claim 20, wherein associating the interrupt with the processor affinity of the application comprises selecting a transmit queue, the transmit queue associated with a message-based interrupt vector which includes the identity of the processor that runs the application.

23. The article of claim 22, wherein the operations further comprise:

sending the data through the selected transmit queue; and transferring packets of the data from the selected transmit queue to the network device.

24. The article of claim 20, wherein the device driver comprises a driver of the network device, the network device including a network interface card.

25. The article of claim 20, wherein the operations further comprise generating an interrupt when the data is stored into a buffer of the network device or when the data is sent out of the network device.

* * * * *